(12) United States Patent
Wright et al.

(10) Patent No.: US 9,639,446 B2
(45) Date of Patent: May 2, 2017

(54) TRACE MONITORING

(75) Inventors: Andrew Wright, Winchester (GB);
Stephen J. Burghard, Winchester (GB); Brenda Hawkins, Winchester (GB); Daniel J. Rivett, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 12/974,522

(22) Filed: Dec. 21, 2010

(65) Prior Publication Data
US 2011/0153817 A1 Jun. 23, 2011

(30) Foreign Application Priority Data
Dec. 21, 2009 (EP) .................................... 09180149

(51) Int. Cl.
*G06F 15/173* (2006.01)
*G06F 11/34* (2006.01)

(52) U.S. Cl.
CPC ...... *G06F 11/3476* (2013.01); *G06F 2201/87* (2013.01)

(58) Field of Classification Search
USPC ......................................................... 709/224
See application file for complete search history.

(56) References Cited

U.S. PATENT DOCUMENTS

| | | | |
|---|---|---|---|
| 5,446,878 A | 8/1995 | Royal | |
| 6,321,263 B1 * | 11/2001 | Luzzi | G06F 11/3495 702/186 |
| 6,609,083 B2 | 8/2003 | Enck et al. | |
| 7,096,315 B2 * | 8/2006 | Takeda | G06F 3/0605 709/224 |
| 7,136,156 B1 * | 11/2006 | Quint | G01M 11/3136 356/73.1 |
| 7,243,046 B1 * | 7/2007 | Patlashenko | G06F 11/3419 702/183 |
| 7,318,219 B2 * | 1/2008 | Hall | G06F 11/3419 709/203 |
| 7,415,453 B2 * | 8/2008 | Suzuki | G06F 11/3409 |

(Continued)

FOREIGN PATENT DOCUMENTS

WO   WO 2007/015922    2/2007

*Primary Examiner* — Tauqir Hussain
(74) *Attorney, Agent, or Firm* — Steven M. Greenberg, Esq.; CRGO Law

(57) ABSTRACT

A method of operating a transaction server for use with trace components, providing an execution cost for each trace component, receiving input selecting one or more trace components, running the transaction server with each selected trace component active, monitoring the execution cost of each selected trace component, and providing an updated execution cost for each trace component. The method can also be extended to provide an execution cost for one or more combinations of trace components monitoring the execution cost of any selected trace component combination, and also to provide an updated execution cost for each trace component combination. The method can further comprise maintaining a record of the execution cost of each selected trace component and transmitting the record to a different transaction server, thereby sharing knowledge between connected systems.

12 Claims, 5 Drawing Sheets

(56) References Cited

U.S. PATENT DOCUMENTS

| | | | | |
|---|---|---|---|---|
| 7,437,716 B1* | 10/2008 | Cantrill | ............... | G06F 11/3636 |
| | | | | 438/758 |
| 7,475,386 B1* | 1/2009 | Shapiro | ............... | G06F 11/3644 |
| | | | | 717/128 |
| 7,617,313 B1* | 11/2009 | Washburn | ........... | G06F 11/3419 |
| | | | | 709/223 |
| 8,327,335 B2* | 12/2012 | Noble | ..................... | G06F 11/32 |
| | | | | 702/119 |
| 8,627,294 B1* | 1/2014 | Cantrill | ............... | G06F 11/3093 |
| | | | | 717/127 |
| 2004/0148152 A1* | 7/2004 | Horikawa | ........... | G06F 11/3447 |
| | | | | 703/22 |
| 2004/0153833 A1* | 8/2004 | Deacon et al. | ................. | 714/38 |
| 2005/0198275 A1* | 9/2005 | D'Alo | ................. | G06F 11/3006 |
| | | | | 709/224 |
| 2006/0074970 A1* | 4/2006 | Narayanan | .......... | G06F 11/3419 |
| 2006/0179136 A1* | 8/2006 | Loboz | ................ | G06F 11/3409 |
| | | | | 709/224 |
| 2007/0100994 A1* | 5/2007 | Armstrong | .............. | G06F 11/28 |
| | | | | 709/224 |
| 2007/0220139 A1* | 9/2007 | Ohta | ................... | G06F 11/3409 |
| | | | | 709/224 |
| 2008/0263044 A1* | 10/2008 | Cantrill | ............... | G06F 11/3466 |
| 2009/0276756 A1* | 11/2009 | Vaidyanathan | ..... | G06F 9/44505 |
| | | | | 717/120 |
| 2010/0083237 A1* | 4/2010 | Kneebone et al. | ........... | 717/128 |
| 2013/0145015 A1* | 6/2013 | Malloy | ................ | H04L 67/025 |
| | | | | 709/224 |
| 2013/0198363 A1* | 8/2013 | Kolluru | ................... | H04L 67/22 |
| | | | | 709/224 |

\* cited by examiner

| TRACE | BASE COST | | ACTIVE |
|---|---|---|---|
| STORAGE | .2% | 400 | NO |
| KERNEL | .3% | 600 | NO |
| DISPATCHER | .1% | 200 | NO |
| SM & KE | .45% | 850 | NO |
| SM & DS | .3% | 600 | YES |
| KE & DS | .35% | 600 | NO |

Fig. 4

TRACE MONITORING

CROSS-REFERENCE TO RELATED APPLICATIONS

This application claims priority under 35 U.S.C. §119(a) to European Patent Application Serial Number 09180149.8, filed Dec. 21, 2009, entitled "TRACE MONITORING", the entirety of which is incorporated herein by reference.

BACKGROUND OF THE INVENTION

Field of the Invention

This invention relates to a method of operating a transaction server and to the transaction server itself.

Description of the Related Art

Transaction processing monitoring systems generally provides diagnostic capabilities. One of the most important diagnostic tools is the use of tracing within a product, to produce a chronological audit trail of events occurring within the system. In one popular transaction processing monitoring system, for example, the internal trace feature provides a rich set of unique trace points, grouped together into a large number of different trace components (for example Kernel, Storage, Dispatcher, Java virtual machine (JVM) (Java and all Java-based trademarks and logos are trademarks of Sun Microsystems, Inc. in the United States, other countries, or both), etc.). Users can select which of these trace components are to be set active within the system and which are to be suppressed. They can do this both statically before restarting the transaction processing system and dynamically by interacting with the transaction processing monitoring system through a trace control transaction.

Users are aware that turning tracing on and having all the trace components set to produce trace entries means that problem determination is much easier. Active tracing can assist both the users themselves, when analysing a failing user application, and also the service provider, when reviewing the documentation for a system failure. However, many users choose to run their transaction processing monitoring systems with the trace function either turned off completely, or with only a subset of the various trace components active. This is because there is a cost in central processing unit (CPU) terms (and extra instruction pathlength to be executed) whenever a trace call is made.

Since users are billed by CPU usage, and affected by response time degradation due to execution pathlengths, the users of transaction servers are keen to reduce any extra cost that can be avoided. If there is no problem to be analysed, there is no need for the transaction processing monitoring system to generate trace data, and so users will often run their transaction processing monitoring systems with little or no tracing active in order to minimise the associated tracing CPU cost and pathlength of instructions to make the trace calls. The trade-off to this approach is that if a transaction processing monitoring system or application problem subsequently occurs, the resulting debugging documentation may be insufficient to resolve the cause of the failure. This jeopardises the policy of First Failure Data Capture (FFDC), where transaction processing monitoring systems attempt to generate all the required documentation the first time a failure occurs, to avoid the need to recreate a failure and gather additional documentation for analysis.

This known exposure to FFDC means that users are interested in knowing the cost in terms of CPU/pathlength when running with transaction processing monitoring system trace active, or when using a particular selection of trace components. However, current transaction servers are unable to provide a specific quantitative answer to this question since it will vary from product release to release, and from different workload usage within a given server region. For example, a transaction processing monitoring system where applications drive many EXEC transaction processing monitoring system commands, which in turn generate many trace entries in specific trace components, will have a different CPU and pathlength cost to a system where many applications run background-type work that generates a lot of application-specific code and relatively few EXEC commands and associated trace calls. There is no specific one-size-fits-all answer that would be appropriate for all users.

Additionally, some transaction processing monitoring systems can generate monitoring data and region-specific data, which give a coarse level of CPU-usage at the region level or at individual transaction levels. However, users still need to analyse this data through post-processing tools to breakdown the CPU usage. Also, users need to run specific benchmark comparisons on their own systems to compare and then contrast CPU costs for various trace settings used for their own specific workloads. At the present time there is no simple and straightforward way to quantify the costs of selecting specific trace settings, or combinations thereof, in a user's bespoke environment. The problem to be solved is the absence of any straightforward method to quantify these costs of selecting particular trace settings and combinations of settings in individual user environments.

BRIEF SUMMARY OF THE INVENTION

According to a first aspect of the present invention, there is provided a method of operating a transaction server for use with a plurality of trace components, comprising providing an execution cost for each trace component, receiving input selecting one or more trace components, running the transaction server with the or each selected trace component active, monitoring the execution cost of the or each selected trace component, and providing an updated execution cost for the or each selected trace component.

According to a second aspect of the present invention, there is provided a transaction server for use with a plurality of trace components, arranged to provide an execution cost for each trace component, receive input selecting one or more trace components, run transactions with the or each selected trace component active, monitor the execution cost of the or each selected trace component, and provide an updated execution cost for the or each selected trace component.

According to a third aspect of the present invention, there is provided a computer program product on a computer readable medium for operating a transaction server, for use with a plurality of trace components, the product comprising instructions for providing an execution cost for each trace component, receiving input selecting one or more trace components, running the transaction server with the or each selected trace component active, monitoring the execution cost of the or each selected trace component, and providing an updated execution cost for the or each selected trace component.

Owing to the invention, it is possible to provide the ability for transaction server products such as CICS to give users a direct indication of the CPU cost/additional pathlength inherent in activating particular trace component settings (and combinations of such settings). This is advantageous over the existing approaches mentioned above. The invention removes the obligation on the users to have to run their own particular benchmark comparison tests to produce the relevant data. The invention also avoids the need to have to use additional tooling to review CPU usage after such comparison benchmarking, by integrating this information directly into the trace control component.

The invention also provides an automated means for the transaction processing system to maintain a record of previous CPU costs/pathlength increases when using specific trace settings (or combinations of trace components) on individual systems, and so be able to provide both a static indication of the relative cost of using them, and a heuristically-maintained record based upon previous system usage.

While there would be an execution cost in having code to record and maintain CPU costs and pathlengths incurred by trace usage, this would be minimal in comparison with the overall costs incurred in driving various combinations of trace settings and so not be an inhibitor towards implementing the mechanism. By guiding users on the costs of using specific trace settings, this invention would provide the user and service provider with essential information which will expedite the time that would otherwise have been lost by the absence of First Failure Data Capture. In turn, this could have a beneficial effect in reducing the cost of the overall service process.

The CPU costs and pathlengths can be captured at runtime when the various trace settings and combinations are in effect. This could be done periodically, or as a snapshot of the running system taken from time to time and be aggregated. The data could be held internally, for example within a transaction processing monitoring system file used for the purpose, although it could be held elsewhere using a database as an alternative. This is an implementation specific issue and not material to the operation of the invention. Wherever the data is held, it can be used to minimise the cost in CPU and pathlength of the capturing and storing of the data. Then, the data could be shared within linked transaction managers by means of system code that distributes the information to other systems within the same network. An alternative would be to use a data repository that was accessible across the network; a record level sharing file would be ideal for this as such a file could be accessed by all systems that opened the file.

BRIEF DESCRIPTION OF THE SEVERAL VIEWS OF THE DRAWINGS

Embodiments of the present invention will now be described, by way of example only, with reference to the accompanying drawings, in which:—

FIG. 4 is a schematic diagram of a display device, and

DETAILED DESCRIPTION OF THE INVENTION

Figure 1:
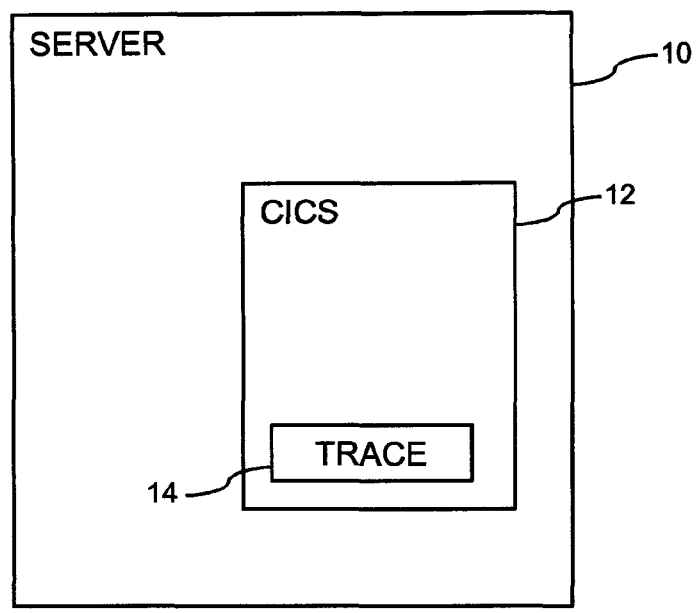
FIG. 1 is a schematic diagram of a transaction server.

FIG. 1 illustrates a transaction server 10 which is running CICS 12. CICS (Customer Information Control System) is a transaction manager that runs primarily on IBM mainframe systems. CICS 12 is a transaction manager designed for rapid, high-volume online processing. CICS 12 includes a tracing function 14 which has various individual trace components that can be active singularly or in combination. When a trace component is active, then it is constantly gathering information about the transactions being performed by CICS 12. Users of the server 10 can select which of the trace components are to be set active within the system and which are to be suppressed. A trace component produces a chronological audit trail of events occurring within the system.

The tracing function 14 has several different elements. Firstly, the system is designed to provide indications of the relative costs in CPU and execution pathlengths for specific trace settings or combinations of trace settings. Preferably, these costs are provided by the supplier of the transaction manager 12 during the product development and hard-coded within the product. The execution costs of individual and combinations of trace components can be expressed in different ways, for example, by reference to a percentage increase in the CPU use relative to the trace component being inactive. For example, selecting CICS trace settings for Storage, Kernel and Dispatcher could generate information on a trace settings screen that looks like:

"General Observations

Use of the SM trace component can lead to a CPU increase of 0.2% over a system without such tracing active.

Use of the KE trace component can lead to a CPU increase of 0.3% over a system without such tracing active.

Use of the DS trace component can lead to a CPU increase of 0.1% over a system without such tracing active.

Use of these combined trace component selections can lead to an overall CPU increase of 0.7% over a base system without trace active.

Use of these combined trace component selections can lead to an overall instruction pathlength increase of 500 instruction cycles over a base system without trace active."

Figure 2:
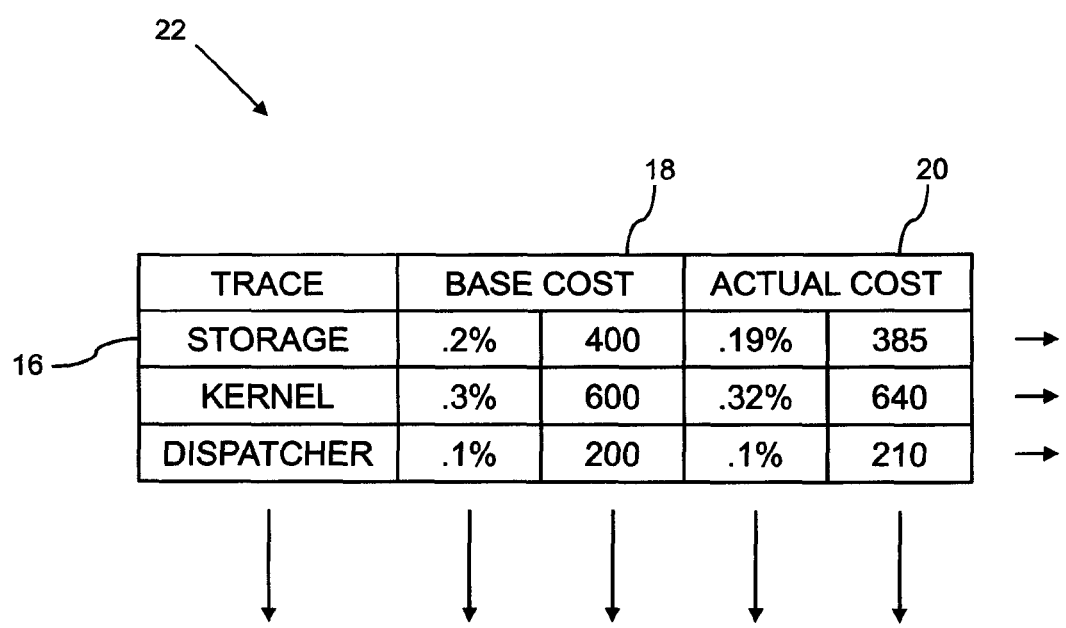
FIG. 2 is a table of tracing components and execution costs.

The system can record the execution costs of different trace components and combinations of components and can maintain a historical database that records the CPU costs and pathlength increases when using specific trace components on the system. In this way the data would be maintained for the specific workloads that the user ran on a given system, and not be dependent upon standard benchmark data provided for a general system. FIG. 2 illustrates the principle. Individual trace components 16 have an execution cost 18 assigned to them when the product is developed, but as the product is actually run, then updated execution costs 20 are recorded in the table 22.

The table 22 could be updated by the system as trace component settings are altered, and will grow to provide an accurate historical record of the execution costs 20 in using specific trace components 16 for a given user environment. The trace function 14 could therefore learn from changes to the user's individual systems, and heuristically reflect these changes in its recommendations to the user when trace component settings were varied in the future. The execution costs 18 and 20 stored in the table 22 are represented as both CPU increase in percentage terms and also in terms of pathlength increase in the number of instructions. The system can use the data to also provide information to the user for CPU usage and pathlength analysis, such as:

"Historical Observations for this Particular System

Use of the SM trace component has historically led to a CPU increase of 0.5% for this particular system without such tracing active.

Use of the KE trace component has historically led to a CPU increase of 0.05% for this particular system without such tracing active.

Use of the DS trace component has historically led to a CPU increase of 0.3% for this particular system without such tracing active.

Use of these combined trace component selections has historically led to an overall CPU increase of 0.9% for this particular system without trace active.

Use of these combined trace component selections has historically led to an overall instruction pathlength increase of 1200 instruction cycles for this particular system without trace active."

The historical table 22 of the use of trace components 16 with their respective execution costs 18 and updated execution costs 20 could also provide specific chronological guidance on the effect of their usage in the past. For example the system could provide an output to the user along the following lines:

"Use of the DS/KE/SM trace component(s) combined on dd/mm/yy at hh:mm:ssss, for a duration of hh:mm:ssss, produced an overall CPU increase of 0.9% for this particular system without trace active.

Use of the DS/KE/SM trace component(s) combined on dd/mm/yy at hh:mm:ssss, for a duration of hh:mm:ssss, produced an overall instruction pathlength increase of 1200 instruction cycles for this particular system without trace active."

Figure 3:
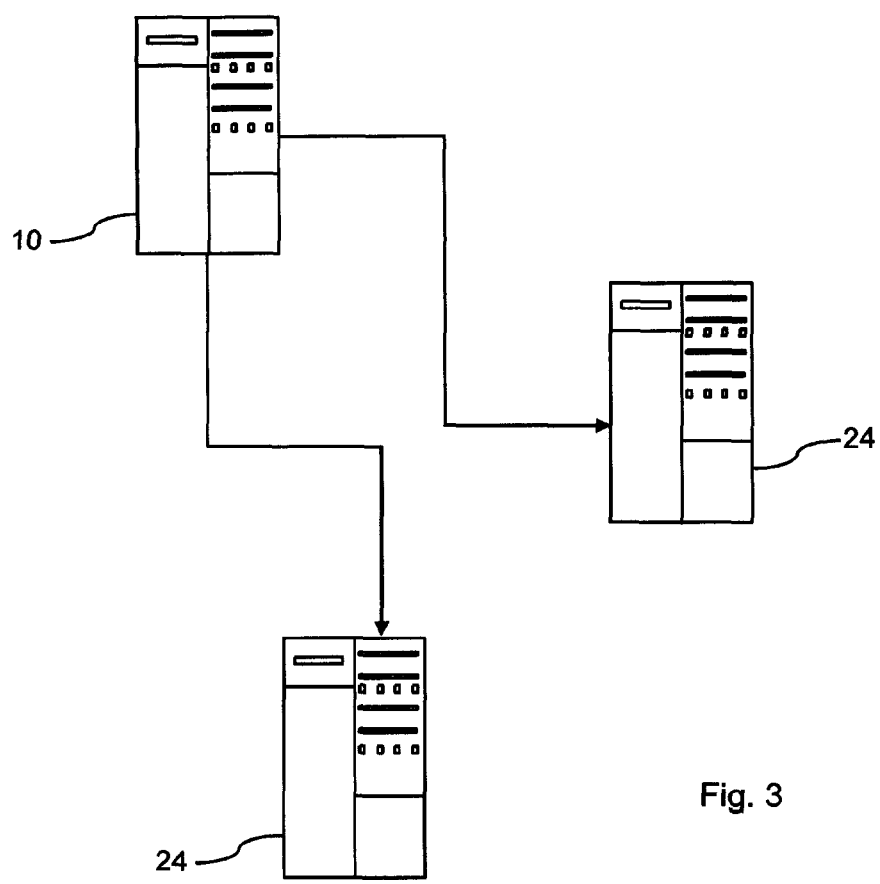
FIG. 3 is a schematic diagram of multiple transaction servers.

The table 22 of the execution costs 18 and 20 of each trace component 16, which provides a record of the execution costs 18 and 20, can be transmitted to a different transaction server 24, as illustrated in FIG. 3. The system could also share this data within the scope of the various systems, so that the historical knowledge built up on one particular transaction processing monitoring system environment 12 could be made available to other regions that the user had which might want to run comparable workloads in the future. This would assist with capacity planning requirements for future growth and mergers, or for planning of CPU costs and response time requirements when spreading work (or cloning regions) in the future.

The table 22 of the execution cost 18 and 20 of each selected trace component 16 can be used to display the changing execution cost 20 of each selected trace component 16 over time. This can be useful for the user or administrator responsible for the server 10 that is operating the transaction manager 12, but can also be useful for the administrators of the other transaction servers 24 who can use the historical data contained within the table 22 to make decisions about which trace components 16 to set to active when the relevant local systems are deployed on the servers 24. In addition to the base execution costs 18 set at development time, there will also be the actual execution costs 20 available for similar systems in real operation.

The system, as indicated above, is also configured to provide an execution cost for one or more combinations of trace components. This is shown in FIG. 4, where in addition to the trace components 16, there are also combinations 28 of trace components with their corresponding execution costs 18. The user is provided with a selection function 30, which allows the user to select one or more individual trace components 16, but also the combinations 28. The system will also monitor the execution cost of any selected trace component combination 28, and provide an updated execution cost for each trace component combination 28, in much the same manner as illustrated in FIG. 2.

The capturing of CPU usage and instruction pathlength (machine cycles) at system and task level is possible with existing technology; this can be done as reporting back at job level or task level. Similarly, performing benchmark tests to generate quantitative figures for the effect of varying trace settings is an existing requirement for users. The trace function 14 can be provided either directly within the transaction processing monitoring system environment 12 or can be provided as a plug-in to existing transaction managers. A computer program product provided on a computer readable medium can embody the methodology disclosed in relation to the trace function 14. A small number of additional instructions are required on top of the trace function 14 itself to gather the CPU and pathlength data for providing to the end user.

The adapted trace function 14 provides the ability to very specifically report on the projected costs in CPU and pathlength/response time for individual trace component selections. The system also has the ability to maintain and update a historical record of these actual costs for individual system usage, by separate users, so capturing the different effects that differing workloads would see. The ability for this captured data to provide a heuristic approach to guiding users on the likely effect of changing their trace settings based upon prior experience of their specific system workloads is also delivered, as is the ability to share this data between user's environments if so desired. The user is also provided with the possibility to see, immediately, the likely impact of deciding to activate particular trace settings or a combination of trace settings.

Figure 5:
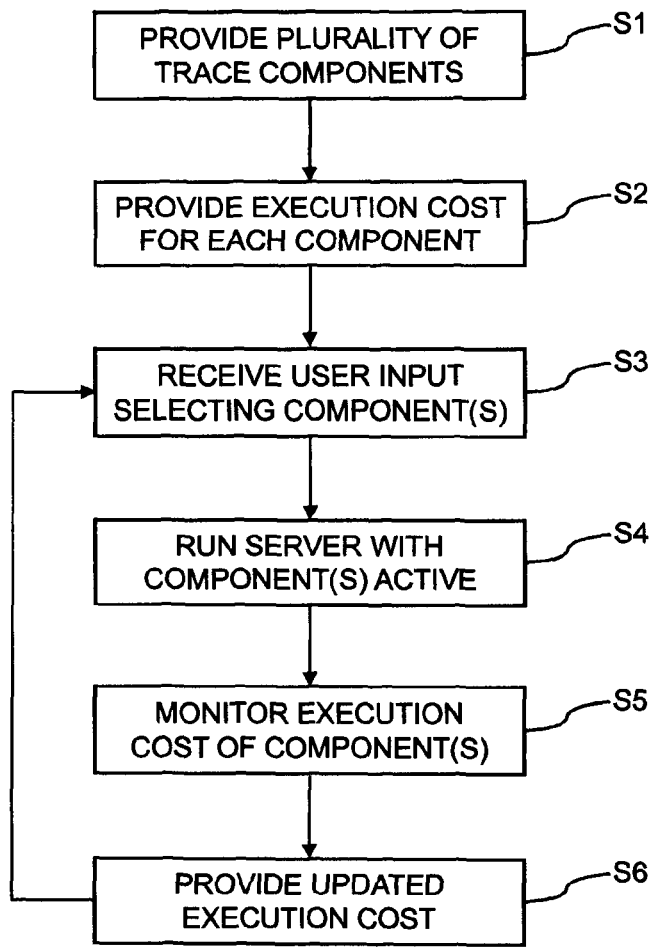
FIG. 5 is a flowchart of a method of operating the transaction server.

The method of operating the transaction server 10 is summarised in FIG. 5. The method comprises, at step S1, providing a plurality of trace components 16 and at step S2 providing an execution cost 18 for each trace component 16 that is provided in step S1. Then, at step S3, there is received a user input selecting one or more trace components 16. The user or administrator, who has access to the execution cost information provided at step S2, can select one or more trace components 16 to be activated based on the anticipated execution cost that is associated with the various trace components 16. The execution cost 18 that is provided to the user is generated when the product is developed, based on the best estimate of the likely execution cost 18 of each trace component 16.

Then at step S4, there is the running of the transaction server 10 with each selected trace component 16 active. Therefore, once the user has chosen those trace components 16 available within the product to be switched on by the trace function 14, then when the transaction processing monitoring system environment 12 is actually operating, the selected trace components 16 will be active. As the transaction processing monitoring system environment 12 processes the transactions produced in the product there is produced a chronological audit trail of events occurring within the system in relation to the specific trace component(s) 16 currently active. This is the normal function of the trace components 16.

In addition to the normal working of the specific trace component(s) 16 which entails the gathering of the relevant trace data, there is also carried out at step S5 the monitoring of the execution cost of each selected trace component 16, and at step S6, providing an updated execution cost 20 for each selected trace component 16. As the transaction manager 12 runs, the level of CPU usage and pathlength increase actually engendered by the selected trace functions 16 is calculated. This allows more accurate data to be generated for the specific application of the transaction processing monitoring system environment 12, which relates to the actual running of the system rather than the estimated execution cost data 18 which was provided at the beginning of the process.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the Figures), and that the software may be provided in the form of one or more computer program elements carried on any suitable data-carrier (also not shown in the Figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

The invention claimed is:

1. A method of operating a transaction server for use with a plurality of trace components, comprising:
    displaying on a display of a computer a list of trace components comprising a kernel trace component, a storage trace component and a dispatch trace component;
    additionally displaying in the list, an execution cost for each of the trace components,
    receiving an input selecting at least one trace component in the list,
    running the transaction server with each selected trace component active while other non-selected ones of the trace components are inactive,
    monitoring both the execution cost of each active selected trace component and also a provided execution cost for at least one combination of trace components, and
    providing in the additional display in the list an updated execution cost both for each selected trace component and also for each trace component combination.

2. A method according to claim 1, wherein the step of providing an execution cost for each trace component comprises displaying at least one of a central processing unit (CPU) cost and a pathlength of the trace component.

3. A method according to claim 1, further comprising maintaining a record of the execution cost of each selected trace component and displaying the changing execution cost of each selected trace component over time.

4. A method according to claim 1, further comprising maintaining a record of the execution cost of each selected trace component and transmitting the record to a different transaction server.

5. A transaction server, for use with a plurality of trace components, comprising a processor arranged to:
    display on a display of a computer a list of trace components comprising a kernel trace component, a storage trace component and a dispatch trace component and additionally display in the list, an execution cost for each of the trace components,
    receive an input selecting at least one trace component in the list,
    run transactions with each selected trace component active while other non-selected ones of the trace components are inactive,
    monitor both the execution cost of each active selected trace component and also a provided execution cost for at least one combination of trace components, and
    provide in the additional display in the list an updated execution cost both for each selected trace component and also for each trace component combination.

6. A server according to claim 5, wherein the server is arranged, when providing an execution cost for each trace component, to display at least one of a central processing unit (CPU) cost and a pathlength of the trace component.

7. A server according to claim 5, wherein the server is further arranged to maintain a record of the execution cost of each selected trace component and display the changing execution cost of each selected trace component over time.

8. A server according to claim 5, wherein the server is further arranged to maintain a record of the execution cost of each selected trace component and transmit the record to a different transaction server.

9. A computer program product comprising a computer readable storage device for operating a transaction server, for use with a plurality of trace components, the computer readable storage medium having stored therein computer readable program instructions for:
- displaying on a display of a computer a list of trace components comprising a kernel trace component, a storage trace component and a dispatch trace component,
- additionally displaying in the list, an execution cost for each of the trace components,
- receiving input selecting at least one trace component in the list,
- running the transaction server with each selected trace component active while other non-selected ones of the trace components are inactive,
- monitoring both the execution cost of each active selected trace component and also a provided execution cost for at least one combination of trace components, and
- providing in the additional display in the list an updated execution cost both for each selected trace component and also for each trace component combination.

10. A computer program product according to claim 9, wherein the instructions for providing an execution cost for each trace component comprise instructions for displaying at least one of a central processing unit (CPU) cost and a pathlength of the trace component.

11. A computer program product according to claim 9, further comprising instructions for maintaining a record of the execution cost of each selected trace component and displaying a changing execution cost of each selected trace component over time.

12. A computer program product according to claim 9, further comprising instructions for maintaining a record of the execution cost of each selected trace component and transmitting the record to a different transaction server.

* * * * *